UNITED STATES PATENT OFFICE.

CONRAD HEUSLER, OF BONN, PRUSSIA, GERMANY.

PROCESS OF PRODUCING SILICIOUS METALS AND UTILIZING THE SAME FOR METALLURGICAL PURPOSES.

SPECIFICATION forming part of Reissued Letters Patent No. 10,852, dated July 19, 1887.

Original No. 358,662, dated March 1, 1887. Application for reissue filed June 21, 1887. Serial No. 242,044. Patented in Germany September 17, 1885, No. 36,607, and in France October 16, 1885, No. 171,698.

*To all whom it may concern:*

Be it known that I, CONRAD HEUSLER, a subject of the King of Prussia, and residing at Bonn, in the Kingdom of Prussia, German Empire, have invented new and useful Improvements in Processes of Producing Silicious Metals and Utilizing the Same for Metallurgical Purposes, (for which I have obtained Letters Patent in Germany, No. 36,607, dated September 17, 1885, and in France, No. 171,698, dated October 16, 1885;) and I do hereby declare that the following is a full, clear, and exact description of the invention.

The object of my invention is to obtain silicide of copper, of tin, and of zinc (or silicious copper, silicious tin, and silicious zinc) by a new process, and of utilizing these compounds for the production of metals and alloys containing a certain amount of silicium, or that are merely refined by means of the silicium, which has the property of absorbing the free as well as the combined oxygen and the carbonic oxide present in the metals and of carrying them away in the slags. The process which I employ for this purpose consists in melting together, with silicious iron, the copper, tin, or zinc to be combined with silicium, in removing from the metallic mass thus obtained the upper portion, and in melting the remaining portion, which is the silicide of copper, of tin, or of zinc, with the metal or metals to be combined therewith and to be impregnated with or purified by the silicium.

If copper is melted with silicide of iron or with pig-iron containing a certain amount of silicium, the copper, on account of its having greater affinity to the silicium than the iron, combines with the silicium to form therewith silicide of copper. If, after complete fusion, the mass thus obtained is left to repose, three different layers form in the same. The undermost layer, which is clearly limited in respect to the next upper one, is constituted by the silicide of copper. The middle layer is composed of iron still containing silicium and some copper, and the upper layer consists of pure cast-iron. In case tin or zinc is used instead of copper, silicide of tin or silicide of zinc is formed, respectively, in like manner.

For the purpose of practically carrying out the invention I proceed as follows: The copper (or tin or zinc) is melted together with the silicious iron in a crucible or in any suitable furnace. The said silicious iron may be the common silicide of iron of commerce, which usually contains about twelve per cent. of silicium; but any ordinary pig-iron containing silicium may also be employed. The molten mass is transferred into a pot or receptacle placed over a furnace in order to be heated, and preferably lined with coal. In this receptacle the mass is allowed to remain at rest, so that the aforesaid layers may form. After this has taken place, and after solidification of the surface portion, which may be accelerated by throwing some water thereon, the said portion is lifted off in form of a disk, in the manner practiced in the production of disk-copper. By repeating this process, first of all the iron is removed, and thereupon the layer of iron and copper (or tin or zinc.) The remaining layer, formed by the silicide of copper, (of tin or of zinc,) may then also be divided into disks, or it is run into molds. The disks obtained from the middle layer are either remelted several times, in view of separating therefrom the iron, or they are used together with a new quantity of silicide of iron, in a subsequent operation for producing silicide of copper, &c.

The amount of silicium absorbed by the aforesaid metals depends, on one hand, upon their different affinity for the same, and, on the other hand, on the relative quantity of silicide of iron employed and the percentage of silicium contained therein. It is greatest with copper, and for this reason I preferably use the silicide of copper for the different final purposes of my invention. Ordinarily three per cent. of silicium contained in this silicide is sufficient to make the same adapted for its various employments, especially for the purification of metals. The silicides of tin and zinc are available even if their percentage in silicium is considerably less. It is, however, easy to raise the amount of silicium contained in the metals by adding a new quantity of silicious iron to the silicide of copper, &c., obtained in one operation, and by repeating the described process.

If the siliciated copper, tin, or zinc is to be employed for refining the like and other metals, the metal or metals to be refined are melted together with such quantity of one or more of the siliciated metals that the amount of silicium contained therein will merely suffice to absorb the oxygen and carbonic oxide contained in the metals to be refined, and without that any considerable portion thereof combines with the metals themselves. In this manner refined copper and common bronze, common manganese bronze, brass, &c., of great purity are produced.

If the siliciated metal is to serve for incorporating silicium into like metals or for producing silicious alloys, a greater quantity thereof is required, so that the silicium will not only act as a refining agent, but that a certain amount of the same will enter into the metal or alloy, and thus produce a new compound of special character. By these means are obtained copper-silicium bronze, bronze consisting of copper, manganese, and silicium, bronze or other alloys of copper, tin, and silicium, of copper, tin, zinc, and silicium, silicious brass, silicious German silver, &c.

The metals to be treated with the silicides may be fused together with the latter in the same pot or receptacle in which these have been separated from the iron, or in a crucible.

In all the metals and alloys obtained as described the silicium has the effect of increasing their strength and ductibility and of imparting to them the property that castings may be made from the same which are free from pores. Moreover, the electric conductibility of the wires made from the copper refined by means of silicium is greater than that of common copper wires.

I am aware of an English patent for the production of the kinds of bronze, brass, gun-metal, and the like, consisting, chiefly, of copper, with tin, zinc, or other white-metal, and the chief object of which patent being to secure strength, elasticity, and closeness of grain in such bronze by the addition of silicious iron, which may contain other metals—such as manganese, &c.—and mixing the mass while in a molten state; but my invention differs from said English patent essentially in that, instead of mixing the molten metals together and only obtaining one alloy impregnated with iron and silicon, I allow the metals to separate by reason of the difference in their specific gravity, and then remove the iron from the other metal, leaving the latter impregnated with silicium, and at the same time producing pure cast-iron which is perfectly free from silicon. Another feature of my invention, which is entirely dissimilar to said English patent, is the method of separating the metals and using the siliciated metals for refining other metals.

I am also aware of an English patent in which it is proposed to manufacture manganese copper by melting ferro-manganese with silicious iron and copper, it being found that the manganese combines with the copper while the iron combines with the silicium; but this is a process which is dissimilar to mine, and I do not wish to claim any feature thereof; but

What I claim as new, and desire to secure by Letters Patent, is—

1. The process of producing silicious copper, silicious tin, and silicious zinc, which consists in melting together silicious iron with copper or tin or zinc, and in removing from the metallic mass thus obtained the upper portion, consisting partly of iron and partly of iron containing copper, tin, or zinc, substantially as hereinbefore described.

2. The process of melting together silicious iron with copper, tin, or zinc, removing from the metallic mass obtained the upper portion, and melting together the remaining portion, consisting of silicious copper, silicious tin, or silicious zinc, with one or more non-silicious metals, for the purpose of refining said non-silicious metals, or producing metals or alloys containing a certain amount of silicium, substantially as specified.

In testimony whereof I have hereunto set my hand in the presence of two subscribing witnesses.

CONRAD HEUSLER.

Witnesses:
EMIL STRAUSS,
EMIL DIESTERNOEG.